United States Patent
Tao et al.

(10) Patent No.: US 10,104,162 B2
(45) Date of Patent: Oct. 16, 2018

(54) INTERACTIVE METHOD, USER TERMINAL, SERVER AND SYSTEM, COMPUTER STORAGE MEDIUM

(71) Applicant: TENCENT TECHNOLOGY (SHENZHEN) COMPANY LIMITED, Shenzhen (CN)

(72) Inventors: Yucao Tao, Shenzhen (CN); Tao Zhou, Shenzhen (CN); Jinfeng Meng, Shenzhen (CN); Xijun Dong, Shenzhen (CN); Rui Zhong, Shenzhen (CN); Jun Yu, Shenzhen (CN); Boqiang Wang, Shenzhen (CN); Han Lian, Shenzhen (CN); Chunlei Zheng, Shenzhen (CN); Wei Wang, Shenzhen (CN); Ye Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 379 days.

(21) Appl. No.: 14/273,830

(22) Filed: May 9, 2014

(65) Prior Publication Data
US 2014/0250385 A1     Sep. 4, 2014

Related U.S. Application Data

(63) Continuation of application No. PCT/CN2013/072154, filed on Mar. 4, 2013.

(30) Foreign Application Priority Data

Mar. 23, 2012    (CN) .......................... 2012 1 0080101

(51) Int. Cl.
*H04W 4/08*    (2009.01)
*G01C 21/36*    (2006.01)
(Continued)

(52) U.S. Cl.
CPC ............. *H04L 67/10* (2013.01); *H04W 4/021* (2013.01); *H04W 4/08* (2013.01); *H04W 4/21* (2018.02); *G01C 21/3679* (2013.01); *H04L 67/18* (2013.01)

(58) Field of Classification Search
CPC ....... H04W 4/02–4/046; H04W 4/206; H04W 4/021–4/022; H04L 51/20; H04L 67/18;
(Continued)

(56) References Cited

U.S. PATENT DOCUMENTS 7,831,917 B1 * 11/2010 Karam ................... G06Q 10/10
                                                          701/408
8,548,503 B2    10/2013 Oh
(Continued)

FOREIGN PATENT DOCUMENTS

CN    101272398 A    9/2008
CN    101616358 A    12/2009
(Continued)

OTHER PUBLICATIONS

International Search Report from PCT/CN2013/072154; dated Jun. 6, 2013.
(Continued)

*Primary Examiner* — Jennifer To
*Assistant Examiner* — Liang Li
(74) *Attorney, Agent, or Firm* — Anova Law Group, PLLC

(57) ABSTRACT

It is described a location based interactive method, user terminal, server, system and computer storage medium, which relate to the field of computers. The method includes: it is send a geographic coordinate of a user's location to a location server; it is received from the location server and displayed a POI list containing at least one POI corresponding to the geographic coordinate; it is acquired a group
(Continued)

creating instruction, and a group creating request is sent to a login server based on the group creating instruction; and interaction is performed with the login server based on a group to provide the user with an intra-group interactive service, where the group is created by the login server based on the POI carried in the group creating request. According to the method, the group is created based on the POI corresponding to the geographic coordinate, and the interactive service is provided to the user based on the group, and thereby extending the interactive mode and range of the location based service, and achieving better sharing of information between users.

21 Claims, 4 Drawing Sheets

(51) Int. Cl.
*H04L 29/08* (2006.01)
*H04W 4/21* (2018.01)
*H04W 4/021* (2018.01)

(58) Field of Classification Search
CPC ........... H04L 4/02–4/046; G06Q 50/01; G06Q 10/1095; G06Q 10/10
See application file for complete search history.

(56) References Cited

U.S. PATENT DOCUMENTS

| | | | |
|---|---|---|---|
| 9,154,561 B2 | 10/2015 | Oh | |
| 2005/0113123 A1 | 5/2005 | Torvinen | |
| 2007/0150444 A1 | 6/2007 | Chesnais | |
| 2007/0281690 A1 | 12/2007 | Altman | |
| 2009/0281988 A1* | 11/2009 | Yoo | G06F 17/30867 |
| 2009/0315995 A1 | 12/2009 | Khosravy | |
| 2009/0319175 A1 | 12/2009 | Khosravy | |
| 2010/0056183 A1 | 3/2010 | Oh | |
| 2010/0205242 A1 | 8/2010 | Marchioro, II et al. | |
| 2010/0248746 A1 | 9/2010 | Saavedra | |
| 2010/0317392 A1 | 12/2010 | Davis | |
| 2011/0196933 A1* | 8/2011 | Jackson | G06Q 10/107 709/206 |
| 2011/0238301 A1 | 9/2011 | Lee | |
| 2011/0238302 A1 | 9/2011 | Lee | |
| 2011/0260860 A1* | 10/2011 | Gupta | G06Q 30/02 340/539.13 |
| 2012/0136900 A1* | 5/2012 | Lee | G06Q 50/01 707/784 |
| 2012/0165035 A1* | 6/2012 | Chen | H04L 51/20 455/456.1 |
| 2012/0204112 A1* | 8/2012 | Levine | G06Q 10/109 715/733 |
| 2012/0238234 A1* | 9/2012 | Duarte | G06Q 50/01 455/404.1 |
| 2014/0019552 A1 | 1/2014 | Oh | |
| 2014/0031073 A1 | 1/2014 | Davis et al. | |
| 2014/0053083 A1* | 2/2014 | Robinson | H04L 65/403 715/753 |
| 2018/0082335 A1* | 3/2018 | Kim | G06Q 50/01 |

FOREIGN PATENT DOCUMENTS

| | | |
|---|---|---|
| CN | 101924996 A | 12/2010 |
| CN | 101272398 B | 6/2011 |
| EP | 1802145 A1 | 6/2007 |
| JP | 2001325199 A | 11/2001 |
| JP | 2004054316 A | 2/2004 |
| JP | 2005516320 A | 6/2005 |
| JP | 2008517402 A | 5/2008 |
| JP | 2010508770 A | 3/2010 |
| JP | 2013543157 A | 11/2013 |
| KR | 20070009771 A | 1/2007 |
| KR | 20120028974 A | 3/2012 |
| KR | 20140090191 A | 7/2014 |

OTHER PUBLICATIONS

Notification of the First Office Action of Korean application No. 10-2014-7012394, dated Jun. 16, 2015.
Supplementary European Search Report in European application No. 13764972.9, dated Mar. 11, 2015.
English Translation of the Written Opinion of the International Search Authority in international application No. PCT/CN2013/072154, dated Jun. 6, 2013.
Notification of the Written Opinion of SG Application No. 11201402128R, dated Aug. 5, 2015.
National Office of Intellectual Property of Vietnam (NOIP) Office Action 1 for 1-2014-01952 dated Apr. 27, 2018 2 Pages (including translation).
Intellectual Property Office of the Philippines Bureau of Patents (IPOPHL) Office Action for Application No. 1/2014/201089 dated Jun. 5, 2018 4 Pages.

* cited by examiner

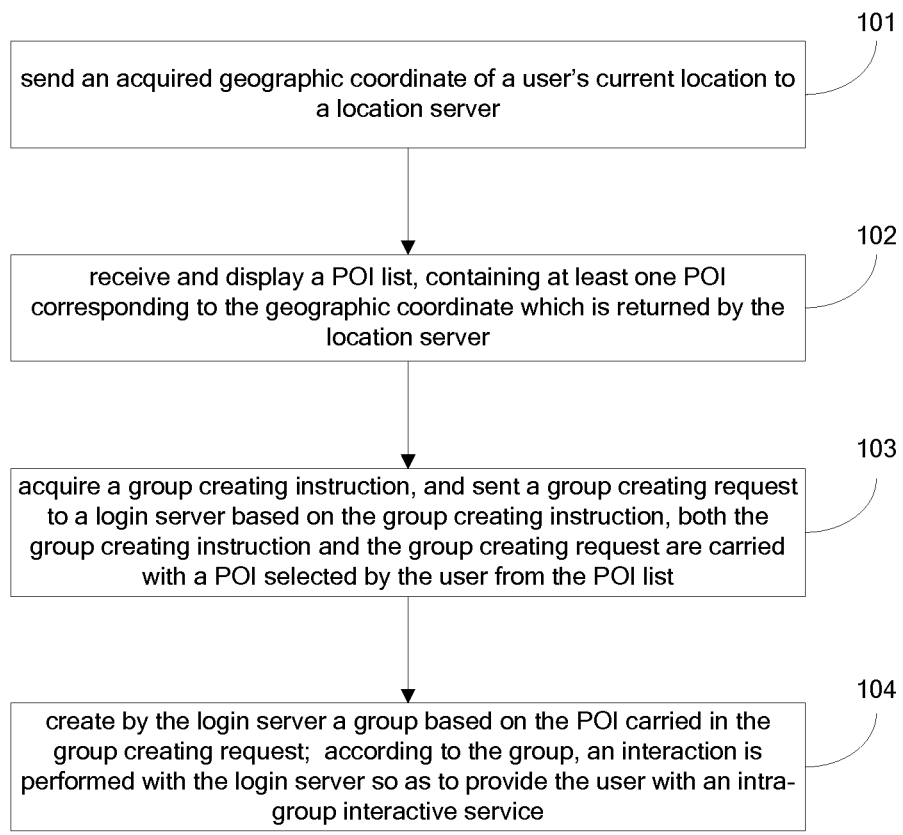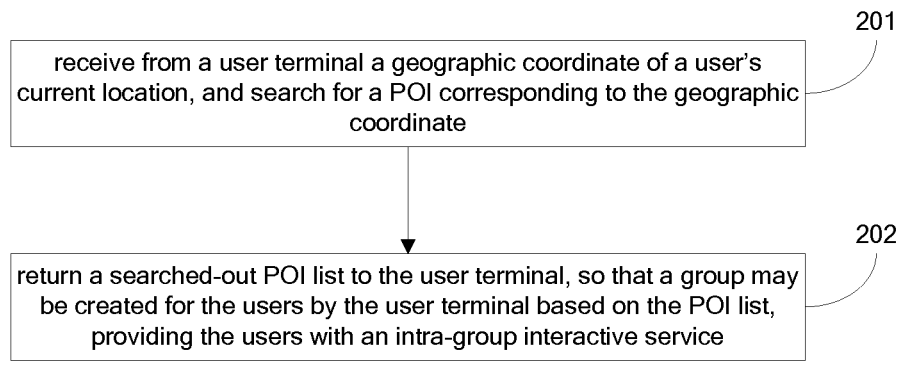

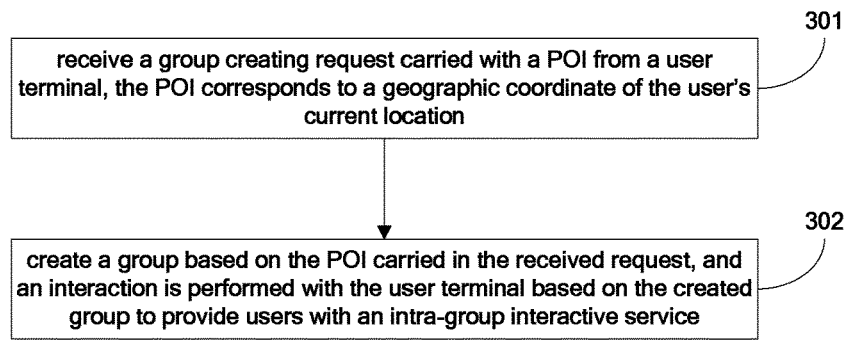
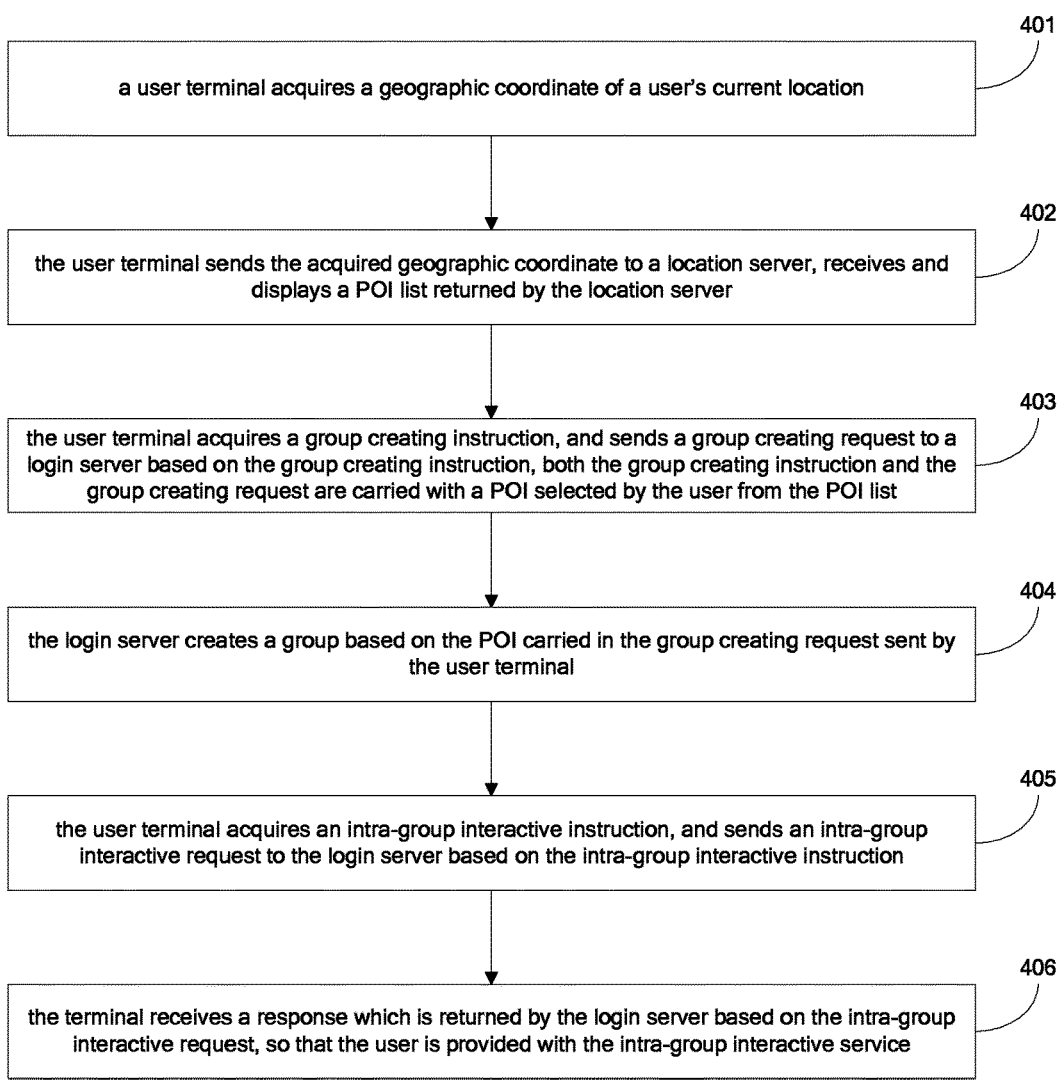

INTERACTIVE METHOD, USER TERMINAL, SERVER AND SYSTEM, COMPUTER STORAGE MEDIUM

CROSS REFERENCE TO RELATED APPLICATIONS

This is a continuation application of International Patent Application No. PCT/CN2013/072154, filed on Mar. 4, 2013, which claims priority to Chinese Patent Application No. 201210080101.5 filed on Mar. 23, 2012, the disclosure of which are incorporated by reference herein in their entirety.

TECHNICAL FIELD

The present disclosure relates to the field of computers, and in particular to a location based interactive method, user terminal, server and system, and a computer storage medium.

BACKGROUND

In recent years, with the continuous development of the computers, network communications and mobile devices, Location Based Service (LBS) has been extensively applied in the fields such as navigation, social networking and amusement. Particularly, the interactive service among the LBS has made users socialize with each other and enjoy amusement in a convenient way.

The existing interactive applications of the LBS are mainly used in combination with actual locations. For example, a user may, after determining his/her actual location, access information on a real place (i.e., Point of Interest (POI)) around the actual location, and the user may also post a his/her user status at the POI for sharing with other users around.

The existing interactive applications of the LBS have at least the following problems:

Users merely interact with the POI, and communicate with other users around only through the way of posting and sharing the user status at the POI. The interactive mode is tedious and thus users cannot share more information through the interaction.

SUMMARY

The embodiments of the present disclosure provide a location based interactive method, user terminal, server and system, and a computer storage medium.

According to an aspect of the disclosure, the embodiments of the present disclosure provide a location based interactive method, including:

an acquired geographic coordinate of a user's current location is sent to a location server; it is received and displayed a POI list returned by the location server, wherein the POI list may include at least one POI corresponding to the geographic coordinate; and interaction is performed with a login server based on a group to provide the user with an intra-group interactive service, wherein the group is created by the login server based on a POI carried in a group creating request.

The embodiments of the present disclosure also provide a user terminal, including:

a sending module configured to send an acquired geographic coordinate of a user's current location to a location server;

a displaying module configured to receive and display information on a real place, i.e., a Point of Interest (POI) list returned by the location server, wherein the POI list may include at least one POI corresponding to the geographic coordinate; and an interacting module configured to interact with a login server based on a group created by the login server to provide the user with an intra-group interactive service, wherein the group is created by the login server based on a POI carried in the group creating request.

The embodiments of the present disclosure also provide a location based interactive method, including:

a geographic coordinate of a user's current location is received from a user terminal; searching for information on a real place, i.e., a Point of Interest (POI) corresponding to the geographic coordinate; and transmitting a searched-out POI list to the user terminal, which enables the user terminal to create a group for the user based on the POI list to provide the user with an intra-group interactive service, wherein the POI list may include at least one searched-out POI.

The embodiments of the present disclosure also provide a server in which a location server is provided (called location server), including:

a receiving module configured to receive a geographic coordinate of a user's current location sent by a user terminal;

a searching module configured to search for information on a real place, i.e., a Point of Interest (POI) corresponding to the geographic coordinate received by the receiving module; and a transmitting module configured to transmit a POI list searched-out by the searching module to the user terminal and enable the user terminal to create a group for the user based on the POI list to provide the user with an intra-group interactive service;

wherein the POI list includes at least one searched-out POI.

The embodiments of the present disclosure also provide a location based interactive method, including:

receiving from a user terminal a group creating request carried with information on a real place, i.e., a Point of Interest (POI), wherein the POI corresponds to a geographic coordinate of a user's current location;

creating a group based on the POI carried in the received request; and interacting with the user terminal based on the created group to provide the user with an intra-group interactive service.

The embodiments of the present disclosure also provide a server in which a login service is provided (called login server), including:

a receiving module configured to receive from a user terminal a group creating request with information on a real place, i.e., a Point of Interest (POI), wherein the POI corresponds to a geographic coordinate of a user's current location;

a creating module configured to create a group based on the POI carried in the group creating request which is received by the receiving module; and an interacting module configured to interact with the user terminal based on the group created by the creating module to provide the user with an intra-group interactive service.

According to another aspect of the disclosure, the embodiments of the present disclosure also provide a location based interactive system, including: the above user terminal; and/or the above location server; and/or the above login server.

According to yet another aspect of the disclosure, the embodiments of the present disclosure also provide a computer storage medium with computer-executable instructions stored thereon, wherein the computer executable instructions are configured to perform the above location based interactive method.

The technical solutions provided by the embodiments of the present disclosure have beneficial effects as follows.

The POI corresponding to the geographic coordinate of the user's current location is searched out, and the interactive service is provided to the user within the group according to the group created based on the POI, and thereby extending the interactive mode and range of the location based service. Through the interactive mode described herein, users can share more information, and thus the ability of information sharing is improved under the internet environment.

BRIEF DESCRIPTION OF THE DRAWINGS

FIG. 1 is a flow chart of a location based interactive method according to a first embodiment of the disclosure;

FIG. 2 is a flow chart of another location based interactive method according to a first embodiment of the disclosure;

FIG. 3 is a flow chart of yet another location based interactive method according to a first embodiment of the disclosure;

FIG. 4 is a flow chart of a location based interactive method according to a second embodiment of the disclosure;

DETAILED DESCRIPTION

Figure 5:
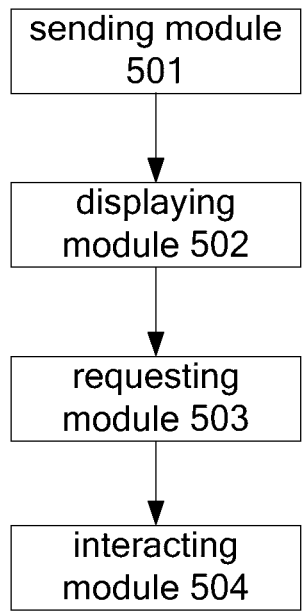
FIG. 5 is a schematic diagram illustrating a structure of a user terminal according to a third embodiment of the disclosure.

In order to make the purpose, the technical solutions as well as the advantages of the embodiments of the present disclosure more clear, the implementation of the present disclosure will be further elaborated below with reference to the accompanying drawings.

A First Embodiment

Referring to FIG. 1, the embodiment provides a location based interactive method. The method in the embodiment may be implemented by a user terminal.

The method according to the embodiment includes the following steps.

In Step 101, an acquired geographic coordinate of a user's current location is sent to a location server.

In Step 102, a POI list, containing at least one POI corresponding to the geographic coordinate, returned by the location server is received and displayed.

In Step 103, a group creating instruction is acquired, and a group creating request is sent to a login server based on the group creating instruction. Both the group creating instruction and the group creating request are carried with a POI selected by the user from the POI list;

In some examples, it may be received a group creating instruction carrying a POI selected by the user from the POI list.

A group creating request may be generated based on the POI carried in the group creating instruction and then may be sent to the login server.

In Step 104, it is created by the login server a group based on the POI carried in the group creating request. According to the group, an interaction is performed with the login server so as to provide the user with an intra-group interactive service.

In some examples, it may be acquired an intra-group interactive instruction, based on which an intra-group interactive request may be sent to the login server. It may be received from the login server a response with respect to the intra-group interactive request, so as to provide the user with the intra-group interactive service.

The intra-group interactive service may include at least one of the following: searching for locations of other users within the group, inviting other users to join the group, receiving requests from other users for joining the group and allowing them to join the group, initiating an intra-group session, allowing the users within the group to jointly complete a POI sign-in.

Referring to FIG. 2, the embodiment provides another location based interactive method. The method in the embodiment may be implemented by a location server. The method according to the embodiment includes the following steps.

In Step 201, a geographic coordinate of a user's current location is received from a user terminal of the user, and it is searched for a POI corresponding to the geographic coordinate.

In some examples, it may be pre-created a location database which is configured to store a relationship between a geographic coordinate and a POI. It may be searched in the location database for a POI corresponding to the received geographic coordinate.

In Step 202, a searched-out POI list is returned to the user terminal, so that a group may be created for the users by the user terminal based on the POI list, providing the users with an intra-group interactive service.

The POI list may include at least one searched-out POI.

Referring to FIG. 3, the embodiment provides yet another location based interactive method. The method in the embodiment may be implemented by a login server. The method according to the embodiment includes the following steps.

In Step 301, it is received a group creating request carried with a POI from a user terminal of a user. The POI corresponds to a geographic coordinate of the user's current location.

In Step 302, a group is created based on the POI carried in the received request, and an interaction is performed with the user terminal based on the created group to provide users with an intra-group interactive service.

In some examples, an intra-group interactive request may be received from the user terminal, and a response may be returned to the user terminal with respect to the intra-group interactive request, so as to provide users with an intra-group interactive service.

The intra-group interactive service may include at least one of the following: searching for locations of other users within the group, inviting other users to join the group, receiving requests from other users for joining the group and allowing them to join the group, initiating an intra-group session, allowing the users within the group to jointly complete a POI sign-in.

The location based service according to the embodiment may provide users with an intra-group interaction based service in various fields such as game, social networking and the like.

In the methods provided by the embodiment of the present disclosure, it may be first found a POI corresponding to a geographic coordinate of the user's current location, after which it may be created a group based on a POI selected by the user, and then an intra-group based interactive service is provided for users within the group. The user may interact with other users via the group, and thus the application range of the location based service is extended, and users are provided with much more convenient interactive operation.

A Second Embodiment

Referring to FIG. 4, the embodiment provides a location based interactive method. In the method, a group is created for users and an intra-group interactive service is provided in the scenario of a LBS game. The method according to the embodiment includes the following steps.

In Step 401, a user terminal acquires a geographic coordinate of a user's current location. The user may play games by using the user terminal.

The user terminal (for example, a mobile terminal) may acquire a geographic coordinate of a user's current location through a radio communication network of a radio operator or through an external locating mode. In a practical application, the user terminal may send the radio communication network of the radio operator or an external locating system a request for reading the current geographic coordinate, and the radio communication network or the external locating system may send the geographic coordinate to the user terminal in response to the request.

In some examples, the radio communication network may include a Global system for mobile communications (GSM) network, a Code Division Multiple Access (CDMA) network, a 3G network and the like. In some examples, the external locating mode may include a Global Positioning System (GPS), etc. In addition to the above-mentioned geographic coordinate acquisition way, other ways may also be applied. The way through which the user terminal acquires the geographic coordinate of the user's current location is not limited to those described herein.

In Step 402, the user terminal sends the acquired geographic coordinate to a location server, receives and displays a POI list returned by the location server.

There may be various ways through which the user terminal sends the acquired geographic coordinate to the location server, and thus it is not limited to the ways described herein. In a specific implementation, the user terminal may send a request carried with the geographic coordinate to the location server for searching for a POI corresponding to the user's current location. The location server may search for a POI according to the geographic coordinate and return the user terminal a POI list corresponding to the geographic coordinate. The POI list returned by the location server may include at least one POI. There may be many ways through which the location server searches for the POI, and thus it is not limited to the ways described herein. In a specific implementation, a location database configured to store a relationship between a geographic coordinate and a POI may be pre-created, and therefore the location server may search the location database for a POI corresponding to the geographic coordinate.

There may be many ways through which the user terminal displays the POI list to the user, and thus there is no limitation on the ways in the embodiments.

In Step 403, the user terminal acquires a group creating instruction, and sends a group creating request to a login server based on the group creating instruction. Both the group creating instruction and the group creating request are carried with a POI selected by the user from the POI list.

The user may select a POI from the POI list displayed by the user terminal, and trigger the group creating instruction carried with the POI to be sent, and thus the user terminal may generate the group creating request based on the POI carried in the group creating instruction after receiving the group creating instruction carried with the POI, and send the group creating request to the login server.

In addition, there may be various ways through which the user terminal receives the group creating instruction carried with the POI. For example, the user may select the POI by means of a touch operation, and trigger the group creating instruction carried with the POI to be sent to the user terminal. In another example, the user may call an application menu and select a group creating option on the menu, so as to trigger the group creating instruction to be sent to the user terminal. There may be many ways through which the user terminal receives the group creating instruction carried with the POI, and thus there is no limitation on the ways in the embodiments.

In Step 404, the login server creates a group based on the POI carried in the group creating request sent by the user terminal.

After receiving the group creating request sent by the user terminal, the login server extracts the POI carried in the request, and creates the group based on the POI extracted from the request.

It should be noted that, the POI carried in the group creating request is selected by the user from the POI list, and corresponds to the geographic coordinate, and therefore the group created by the login server based on the POI carried in the group creating request may be considered as a group created based on the geographic location. The group creating request sent by the user terminal may include only one POI, or may include multiple POIs. In case there is only one POI in the group creating request, the created group may include the geographic location corresponding to the one POI. In case there are multiple POIs in the group creating request, the created group may include geographic locations corresponding to the multiple POIs. There is no limitation on the number of the POI carried in the group creating request.

In Step 405, the user terminal acquires an intra-group interactive instruction, and sends an intra-group interactive request to the login server based on the intra-group interactive instruction.

After creating the group in Step 404, the login server may return the created group to the user terminal, which in turn displays the created group to the user. Therefore, the user may trigger the intra-group interactive instruction to be sent to the user terminal based on the created group, the user terminal may then send the intra-group interactive request to the login server based on the intra-group interactive instruction.

The login server may provide various intra-group interactive services to the user, for example, searching for locations of other users within the group based on the user's instruction, inviting other users to join the group based on the user's instruction, receiving requests from other users for joining the group and allowing them to join the group, initiating an intra-group session based on the user's request, allowing the users within the group to jointly complete a POI sign-in, etc. There may be various intra-group interactive services the login server provides to the user, and thus there is no limitation on the kind of the intra-group interactive service. There is also no limitation on the way through which the login server provides the intra-group interactive service to the user. And there is no limitation on an interactive service corresponding to an intra-group interactive instruction sent by the user. After a specific interactive service is selected by the user, the user terminal sends an intra-group interactive request corresponding to the interactive service to the login server.

In Step 406, the user terminal receives a response which is returned by the login server based on the intra-group interactive request, so that the user is provided with the intra-group interactive service.

After receiving the intra-group interactive request sent by the user terminal, the login server returns a response corresponding to the request to the user terminal, so as to provide the user with the intra-group interactive service.

It should be noted that, in addition to the field of game, the method in the embodiment of the present disclosure may also be applied in other fields such as social networking, public service and the like, so as to provide the user with services such as making friends, searching and the like. In the embodiments, there is no limitation on the application scenario.

In the method provided by the embodiment, it may be determined the geographic coordinate of the user's current location, after which it may be searched out a POI corresponding to the geographic coordinate, it may be created a group based on a POI selected by the user (the group corresponding to the selected POI may be the one the user wants to join), and then an intra-group based interactive service is provided for users within the group. The user may interact with other users via the group, and thus the application range of the location based service is extended, and users are provided with much more convenient interactive operation.

A Third Embodiment

The embodiment provides a user terminal. Referring to FIG. 5, the user terminal may include:

a sending module 501 configured to acquire a geographic coordinate of a user's current location and send the geographic coordinate to a location server;

a displaying module 502 configured to receive and display a POI list, containing at least one POI corresponding to the geographic coordinate, returned by the location server;

a requesting module 503 configured to acquire a group creating instruction, and send a group creating request to a login server based on the group creating instruction, both the group creating instruction and the group creating request carrying a POI selected by the user from the POI list; and an interacting module 504 configured to interact with the login server based on a group created by the login server so as to provide the user with an intra-group interactive service, where the group is created by the login server based on the POI carried in the group creating request.

The way through which the sending module 501 sends the acquired geographic coordinate of the user's current location to a location server is as described in Steps 401 and 402 of the second embodiment, and will be omitted here. The way through which the displaying module 502 receives and displays the POI list returned by the location server is as described in Step 402 of the second embodiment, and will be omitted here.

The requesting module 503 may be configured to receive the group creating instruction carried with the POI selected by the user from the POI list, generate the group creating request based on the POI carried in the group creating instruction, and send the group creating request to the login server.

Further, the interacting module 504 may be configured to acquire an intra-group interactive instruction, send an intra-group interactive request to the login server based on the intra-group interactive instruction, and receive a response returned by the login server based on the intra-group interactive request, so as to provide the user with the intra-group interactive service.

The intra-group interactive service may include at least one of the following: searching for locations of other users within the group, inviting other users to join the group, receiving requests from other users for joining the group and allowing them to join the group, initiating an intra-group session, allowing the users within the group to jointly complete a POI sign-in.

The way through which the requesting module 503 acquires the group creating instruction and sends the group creating request to the login server is as described in Step 403 of the second embodiment, and will be omitted here. The way through which the interacting module 504 interacts with the login server is as described in step 405 of the second embodiment, and will be omitted here.

The user terminal provided by the embodiment acquires a POI corresponding to the geographic coordinate of the user's current location and requests to create a group based on the POI selected by the user. Thus, the group is created automatically. The user terminal provided by the embodiment also provides the user with the intra-group interactive service based on the created group, which enables the user to interact with other users via the group, and thus the application range of the location based service is extended, and users are provided with much more convenient interactive operation.

A Fourth Embodiment

Figure 6:
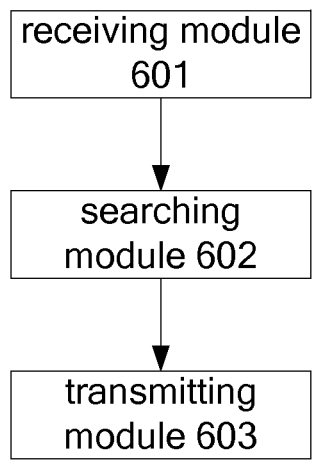
FIG. 6 is a schematic diagram illustrating a structure of a location server according to a fourth embodiment of the disclosure.

Referring to FIG. 6, the embodiment provides a server in which a location service may be provided (called location server in the application). The location server may include:

a receiving module 601 configured to receive a geographic coordinate of a user's current location sent by a user terminal;

a searching module 602 configured to search for a POI corresponding to the geographic coordinate received by the receiving module 601; and a transmitting module 603 configured to transmit a POI list searched-out by the searching module 602 to the user terminal, which enable the user terminal to create a group for the user based on the POI list so as to provide the user with an intra-group interactive service.

The POI list may include at least one searched-out POI.

The way through which the receiving module 601 receives the geographic coordinate and the way through which the user terminal acquires the geographic coordinate are as described in Step 401 of the second embodiment, and will be omitted here.

Figure 7:
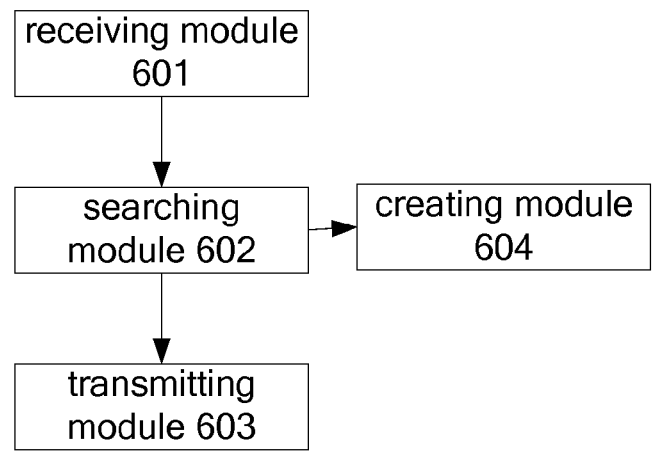
FIG. 7 is a schematic diagram illustrating a structure of another location server according to a fourth embodiment of the disclosure.

Referring to FIG. 7, the location server may further include:

a creating module 604 configured to pre-create a location database which is used to store a relationship between a geographic coordinate and a POI.

The searching module 602 may be configured to search the location database for a POI corresponding to the geographic coordinate.

The location server provided by the embodiment pre-stores the POI corresponding to the geographic coordinate, returns the searched-out POI list to the user terminal after receiving the geographic coordinate from the user terminal, which enables the user terminal to create the group for the user based on the POI list so as to provide the user with the intra-group interactive service, and further enables the user to interact with other users via the group. Thus, the application range of the location based service is extended, and users are provided with much more convenient interactive operation.

A Fifth Embodiment

Figure 8:
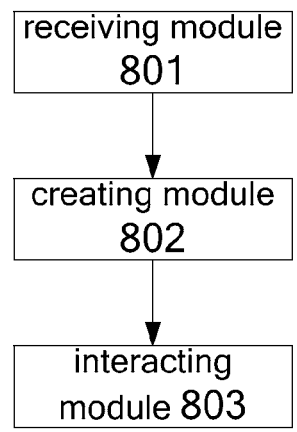
FIG. 8 is a schematic diagram illustrating a structure of a login server according to a fifth embodiment of the disclosure.

Referring to FIG. 8, the embodiment provides a server in which a login service may be provided (called login server in the application). The login server may include:

a receiving module 801 configured to receive from a user terminal a group creating request carried with a POI, where the POI corresponds to a geographic coordinate of a user's current location;

a creating module 802 configured to create a group based on the POI carried in the request which is received by the receiving module 801; and an interacting module 803 configured to interact with the user terminal based on the group created by the creating module 802 so as to provide the user with an intra-group interactive service.

The way through which the receiving module 801 receives the group creating instruction from the user terminal is as described in Step 403 of the second embodiment, and will be omitted here. The way through which the creating module 802 creates the group based on the POI is as described in Step 404 of the second embodiment, and will be omitted here.

Further, according to the description in step 405 of the second embodiment, the interacting module 803 may be configured to receive an intra-group interactive request sent by the user terminal, and return a response to the user terminal based on the intra-group interactive request so as to provide the user with the intra-group interactive service.

The intra-group interactive service may include at least one of the following: searching for locations of other users within the group, inviting other users around to join the group, receiving requests from other users for joining the group and allowing them to join the group, initiating an intra-group session, allowing users within the group to jointly complete a POI sign-in.

The login server provided by the embodiment creates the group for the user based on the POI carried in the group creating request from the user terminal and provides the user with the intra-group interactive service, which enables the user to interact with other users via the group, and thus the application range of the location based service is extended, and users are provided with much more convenient interactive operation.

A Sixth Embodiment

Figure 9:
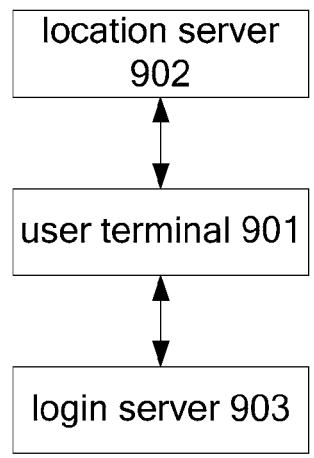
FIG. 9 is a schematic diagram illustrating a structure of a location based interactive system according to a sixth embodiment of the disclosure.

Referring to FIG. 9, the embodiment provides a location based interactive system. The system may include one or multiple devices of the following: a user terminal 901 provided by the third embodiment, a location server 902 provided by the fourth embodiment, and a login server 903 provided by the fifth embodiment.

According to the system provided by the embodiment, the user terminal sends a request to the location server for searching for a POI corresponding to a geographic coordinate of a user's current location, and sends a group creating request carried with the POI to the login server, after that the login server creates a group based on the POI selected by the user, and provides the user with an intra-group interactive service based on the created group, which in turn enables the user to interact with other users via the group, and thus the application range of the location based service is extended, and users are provided with much more convenient interactive operation.

It should be noted that the user terminal, the location server and the login server provided by the above embodiments, when providing the location based interactive service, are merely illustrated according to their respective function modules. In a practical application, the above functions may be allocated to different function modules as required, i.e., internal structures of the devices may be divided into different function modules to complete all or part of the functions described above. In addition, the user terminal, the location server and the login server provided by the above embodiments involve a same idea as the embodiments of the location based interactive method, and their implementations may be referred to the method embodiments and will be omitted here.

When implemented in form of a software functional module and sold or used as an independent product, the integrated modules in an embodiment of the present disclosure may be stored in a computer-readable storage medium. Based on such an understanding, the essential part (or a part of the technical solution of an embodiment of the present disclosure contributing to prior art) may appear in form of a software product, which software product is stored in a storage medium, and includes a number of instructions for allowing a computing equipment (such as a personal computer, a server, a network equipment, or the like) to execute all or part of the methods in various embodiments of the present disclosure. The storage media include various media that can store program codes, such as a U disk, a mobile hard disk, a Read-Only Memory (ROM), a Random Access Memory (RAM), a magnetic disk, a CD, and the like. Thus, an embodiment of the present disclosure is not limited to any specific combination of hardware and software.

Accordingly, an embodiment of the present disclosure further provides a computer storage medium, on which a computer program configured to perform the location based interactive method in the embodiments of the present disclosure is stored.

What described are merely preferred embodiments of the disclosure, and are not intended to limit the scope of the present disclosure.

The invention claimed is:

1. A location based interactive method, comprising:
acquiring, by a user terminal, a geographic coordinate of a user's location;
sending, by the user terminal, the acquired geographic coordinate to a location server;
receiving and displaying, by the user terminal, a Point of Interest (POI) list from the location server, wherein the POI list comprises at least one POI corresponding to the geographic coordinate;
according to a selection by the user from the POI list, sending, by the user terminal, a group creating instruction to a login server, such that the login server directly creates a group in response to the group creating instruction, wherein the login server is separate from the location server, and does not communicate with the location server; and
interacting, by the user terminal, with the login server based on the group created by the login server so as to provide the user with an intra-group interactive service,
wherein the group is created by the login server based on a POI carried in a group creating request,
wherein the group includes only the user of the user terminal when the group is created, and other users in the group are added only by invitation or join request, and
wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in;
wherein the method further comprises: before the interacting with a login server based on a group created by the login server, acquiring the group creating instruction; and sending the group creating request to the login server based on the group creating instruction, wherein both the group creating instruction and the group creating request are carried with a POI selected by the user from the POI list;
wherein:
the POI list comprises at least two POIs corresponding to the geographic coordinate;
the group creating request includes multiple POIs selected by the user from the POI list; and
the created group is associated with geographic locations corresponding to the multiple POIs.

2. The method according to claim 1, wherein the acquiring a group creating instruction and sending a group creating request to the login server based on the group creating instruction comprises:
receiving the group creating instruction carried with the POI selected by the user from the POI list;
generating the group creating request based on the POI carried in the group creating instruction; and
sending the group creating request to the login server.

3. The method according to claim 1, wherein the interacting with a login server based on a group created by the login server comprises:
acquiring an intra-group interactive instruction;
sending an intra-group interactive request to the login server based on the intra-group interactive instruction; and
receiving from the login server a response corresponding to the intra-group interactive request, so as to provide the user with the intra-group interactive service.

4. The method according to claim 1, further comprising:
receiving a request for joining the created group corresponding to the selected POI, the request being initiated by the user without an invitation.

5. A user terminal, comprising: a computer processor and a non-transitory computer storage medium storing computer readable instructions that when executed by the computer processor cause the computer processor to:
acquire a geographic coordinate of a user's location and send the geographic coordinate to a location server;
receive and display a Point of Interest (POI) list from the location server, wherein the POI list comprises at least one POI corresponding to the geographic coordinate;
according to a selection by the user from the POI list, sending a group creating instruction to a login server, such that the login server directly creates a group in response to the group creating instruction, wherein the login server is separate from the location server and does not communicate with the location server; and
interact with the login server based on the group created by the login server so as to provide the user with an intra-group interactive service, wherein the group is created by the login server based on a POI carried in the group creating request, the group includes only the user of the user terminal when the group is created, and other users in the group are added only by invitation or join request, and
wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in,
wherein the non-transitory computer storage medium further stores computer readable instructions that when executed by the computer processor cause the computer processor to:
acquire the group creating instruction, and send a group creating request to the login server based on the group creating instruction, wherein both the group creating instruction and the group creating request are carried with a POI selected by the user from the POI list,
wherein the POI list comprises at least two POIs corresponding to the geographic coordinate;
the group creating request includes multiple POIs selected by the user from the POI list; and
the created group is associated with geographic locations corresponding to the multiple POIs.

6. The user terminal according to claim 5, the non-transitory computer storage medium further storing computer readable instructions that when executed by the computer processor cause the computer processor to:
receive the group creating instruction carried with the POI selected by the user from the POI list, generate the group creating request based on the POI carried in the group creating instruction, and send the group creating request to the login server.

7. The user terminal according to claim 5, wherein the non-transitory computer storage medium further storing computer readable instructions that when executed by the computer processor cause the computer processor to:
acquire an intra-group interactive instruction, send an intra-group interactive request to the login server based on the intra-group interactive instruction, and receive from the login server a response corresponding to the intra-group interactive request, so as to provide the user with the intra-group interactive service.

8. A location based interactive method, comprising:
receiving, by a location server, a geographic coordinate of a user's location sent by a user terminal;
searching, by the location server, for a Point of Interest (POI) corresponding to the geographic coordinate; and
transmitting, by the location server, a searched-out POI list to the user terminal, which enables the user terminal to create a group for the user based on the POI list so as to provide the user with an intra-group interactive service;
according to a selection by the user from the POI list, sending, by the user terminal, a group creating instruction to the login server, such that the login server directly creates the group in response to the group creating instruction, wherein the login server is separate from the location server, and does not communicate with the location server;
wherein the group includes only the user of the user terminal when the group is created, and other users in the group are added only by invitation or join request, and
wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in,
wherein the method further comprises: acquiring, by the user terminal, the group creating instruction; and sending a group creating request to the login server based on the group creating instruction, wherein both the group creating instruction and the group creating request are carried with a POI selected by the user from the POI list;
wherein:
the POI list comprises at least two POIs corresponding to the geographic coordinate;
the group creating request includes multiple POIs selected by the user from the POI list; and
the created group is associated with geographic locations corresponding to the multiple POIs.

9. The method according to claim 8, further comprising: before the searching for a Point of Interest (POI) corresponding to the geographic coordinate,
pre-creating a location database configured to store a relationship between a geographic coordinate and a POI,
wherein the searching for a Point of Interest (POI) corresponding to the geographic coordinate comprises:
searching the location database for a POI corresponding to the geographic coordinate.

10. A location server, comprising: a computer processor and a non-transitory computer storage medium storing computer readable instructions that when executed by the computer processor cause the computer processor to:
receive a geographic coordinate of a user's location sent by a user terminal;
search for a Point of Interest (POI) corresponding to the geographic coordinate; and
transmit a POI list searched-out to the user terminal, which enables the user terminal to create a group for the user based on the POI list so as to provide the user with an intra-group interactive service, wherein the user terminal acquires a group creating instruction and sends a group creating request to a login server according to a selection by the user from the POI list, such that the login server directly creates the group in response to the group creating instruction, wherein the login server is separate from the location server and does not communicate with the location server, and both the group creating instruction and the group creating request are carried with a POI selected by the user from the POI list,
wherein the group includes only the user of the user terminal when the group is created, and other users in the group are added only by invitation or join request, and
wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in,
wherein the POI list comprises at least two POIs corresponding to the geographic coordinate;
the group creating request includes multiple POIs selected by the user from the POI list; and
the created group is associated with geographic locations corresponding to the multiple POIs.

11. The location server according to claim 10, the non-transitory computer storage medium further storing computer readable instructions that when executed by the computer processor cause the computer processor to:
pre-create a location database, wherein the location database is configured to store a relationship between a geographic coordinate and a POI, and
wherein the computer processor is configured to search the location database for a POI corresponding to the geographic coordinate.

12. A location based interactive method, comprising:
receiving, by a login server, from a user terminal a group creating request carried with a Point of Interest (POI), wherein the POI corresponds to a geographic coordinate of a user's location, wherein the group creating request is sent according to a selection by the user from a POI list, the POI list being received by the user terminal from a location server according to a geographic coordinate of a user's location, wherein the login server is separate from the location server and does not communicate with the location server; and
interacting, by the login server, with the user terminal based on the created group so as to provide the user with an intra-group interactive service,
wherein the group includes only the user of the user terminal when the group is created, and other users in the group are added only by invitation or join request, and
wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in,
wherein the POI list comprises at least two POIs corresponding to the geographic coordinate;
the group creating request includes multiple POIs selected by the user from the POI list; and
the created group is associated with geographic locations corresponding to the multiple POIs.

13. The method according to claim 12, wherein the interacting with the user terminal based on the created group comprises:

receiving an intra-group interactive request from the user terminal, and sending a response to the user terminal based on the intra-group interactive request so as to provide the user with the intra-group interactive service.

14. A login server, comprising: a computer processor and a non-transitory computer storage medium storing computer readable instructions that when executed by the computer processor cause the computer processor to:

receive from a user terminal a group creating request carried with a Point of Interest (POI), wherein the group creating request is sent according to a selection by the user from a POI list, the POI list being received by the user terminal from a location server according to a geographic coordinate of a user's location, wherein the login server is separate from the location server and does not communicate with the location server; and interact with the user terminal based on the group so as to provide the user with an intra-group interactive service, wherein the group includes only the user of the user terminal when the group is created, and other users in the group are added only by invitation or join request, and wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in, wherein the POI list comprises at least two POIs corresponding to the geographic coordinate;

the group creating request includes multiple POIs selected by the user from the POI list; and the created group is associated with geographic locations corresponding to the multiple POIs.

15. The server according to claim 14, wherein the non-transitory computer storage medium further storing computer readable instructions that when executed by the computer processor cause the computer processor to:

receive an intra-group interactive request from the user terminal, and send a response to the user terminal based on the intra-group interactive request so as to provide the user with the intra-group interactive service.

16. A location based interactive system, comprising:

a user terminal, a location server, and a login server, wherein the user terminal is configured to:

acquire a geographic coordinate of a user's location and send the geographic coordinate to a location server;

receive and display a Point of Interest (POI) list from the location server, wherein the POI list comprises at least one POI corresponding to the geographic coordinate;

according to a selection by the user from the POI list, acquire a group creating instruction, and send a group creating request to the login server based on the group creating instruction, such that the login server directly creates a group in response to the group creating instruction, wherein both the group creating instruction and the group creating request are carried with a POI selected by the user from the POI list; and interact with a login server based on the group created by the login server so as to provide the user with an intra-group interactive service, wherein the group is created by the login server based on a POI carried in the group creating request, wherein the location server is configured to receive the geographic coordinate of the user's location sent by the user terminal, search for the POI corresponding to the geographic coordinate, and transmit the POI list searched-out to the user terminal, which enables the user terminal to create a group for the user based on the POI list so as to provide the user with the intra-group interactive service, wherein the POI list comprises at least one searched-out POI, wherein the login server is configured to receive from the user terminal the group creating request carried with the POI, wherein the POI corresponds to the geographic coordinate of the user's location, create a group based on the POI carried in the group creating request, and interact with the user terminal based on the group so as to provide the user with the intra-group interactive service, wherein the login server is separate from the location server, and does not communicate with the location server;

wherein the group includes only the user of the user terminal when the group is created, and other users in the group are added only by invitation or join request, and wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in, wherein:

the POI list comprises at least two POIs corresponding to the geographic coordinate;

the group creating request includes multiple POIs selected by the user from the POI list; and the created group is associated with geographic locations corresponding to the multiple POIs.

17. A non-transitory computer-readable storage medium storing instructions thereon for execution by at least one processing circuit, the instructions comprising:

acquiring, by a user terminal a geographic coordinate of a user's location;

sending, by the user terminal, the acquired geographic coordinate to a location server;

receiving and displaying, by the user terminal, a Point of Interest (POI) list from the location server, wherein the POI list comprises at least one POI corresponding to the geographic coordinate;

according to a selection by the user from the POI list, sending, by the user terminal, a group creating instruction to a login server, such that the login server directly creates a group in response to the group creating instruction, wherein the login server is separate from the location server and does not communicate with the location server; and interacting, by the user terminal, with the login server based on the group created by the login server so as to provide the user with an intra-group interactive service, wherein the group is created by the login server based on a POI carried in a group creating request, wherein the group includes only the user of the user terminal when the group is created, and other users in the group are added only by invitation or join request, and wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in, wherein the instructions further comprise: acquiring the group creating instruction; and sending a group creating request to the login server based on the group creating instruction, wherein both the group creating instruction and the group creating request are carried with a POI selected by the user from the POI list, wherein:

the POI list comprises at least two POIs corresponding to the geographic coordinate;

the group creating request includes multiple POIs selected by the user from the POI list; and the created group is associated with geographic locations corresponding to the multiple POIs.

18. The non-transitory computer-readable storage medium according to claim 17, wherein the acquiring a group creating instruction and sending a group creating request to the login server based on the group creating instruction comprises:

receiving the group creating instruction carried with the POI selected by the user from the POI list;

generating the group creating request based on the POI carried in the group creating instruction; and sending the group creating request to the login server.

19. The non-transitory computer-readable storage medium according to claim 17, wherein the interacting with a login server based on a group created by the login server comprises:

acquiring an intra-group interactive instruction;

sending an intra-group interactive request to the login server based on the intra-group interactive instruction; and receiving from the login server a response corresponding to the intra-group interactive request, so as to provide the user with the intra-group interactive service.

20. A non-transitory computer-readable storage medium storing instructions thereon for execution by at least one processing circuit, the instructions comprising:

receiving, by a login server, from a user terminal a group creating request carried with a Point of Interest (POI), wherein the POI corresponds to a geographic coordinate of a user's location, wherein the group creating request is sent according to a selection by the user from a POI list, the POI list being received by the user terminal from a location server according to a geographic coordinate of a user's location, wherein the login server is separate from the location server and does not communicate with the location server; and interacting, by the login server, with the user terminal based on the created group so as to provide the user with an intra-group interactive service, wherein the group includes only the user of the user terminal when the group is created, and other users in the group are added only by invitation or join request, and wherein the intra-group interactive service comprises: searching for a location of another user within the group, inviting another user to join the group, receiving a request from another user for joining the group and allowing the another user to join the group, initiating an intra-group session, allowing users within the group to jointly complete a POI sign-in, wherein the POI list comprises at least two POIs corresponding to the geographic coordinate;

the group creating request includes multiple POIs selected by the user from the POI list; and the created group is associated with geographic locations corresponding to the multiple POIs.

21. The non-transitory computer-readable storage medium according to claim 20, wherein the interacting with the user terminal based on the created group comprises:

receiving an intra-group interactive request from the user terminal, and sending a response to the user terminal based on the intra-group interactive request so as to provide the user with the intra-group interactive service.

* * * * *